April 17, 1934.          E. R. THOMAS          1,955,692
ELECTRIC CABLE
Filed March 25, 1929          3 Sheets-Sheet 1
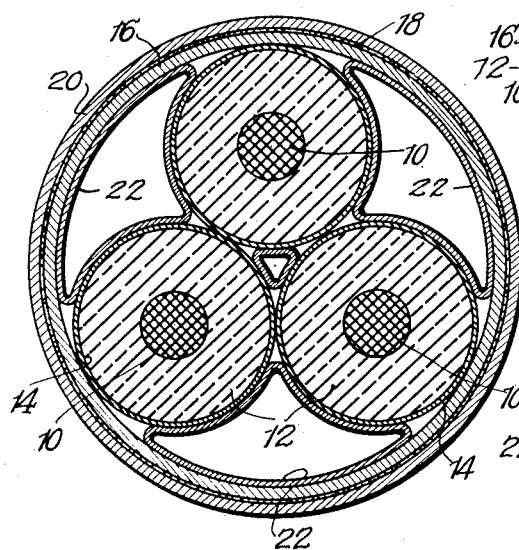
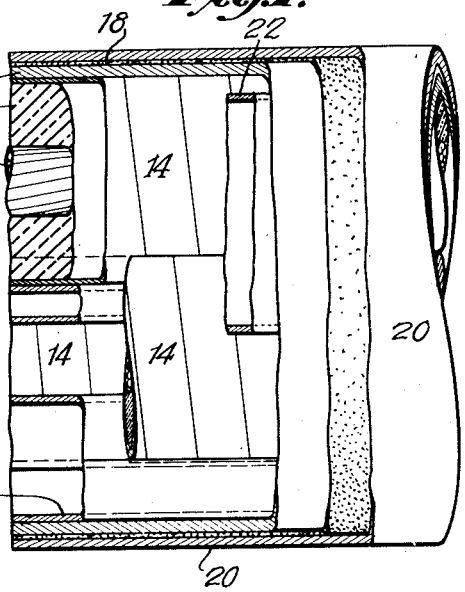
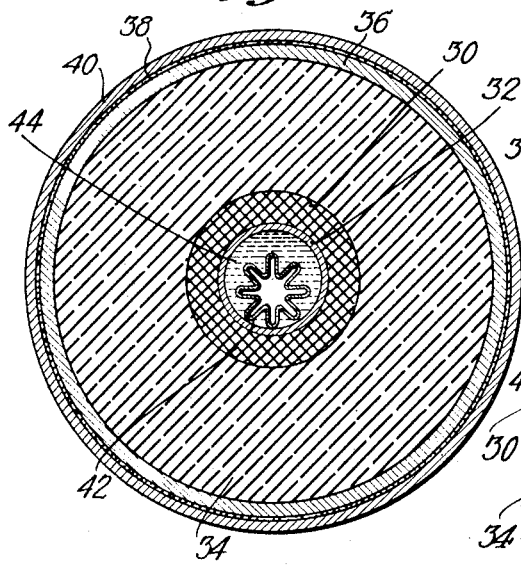
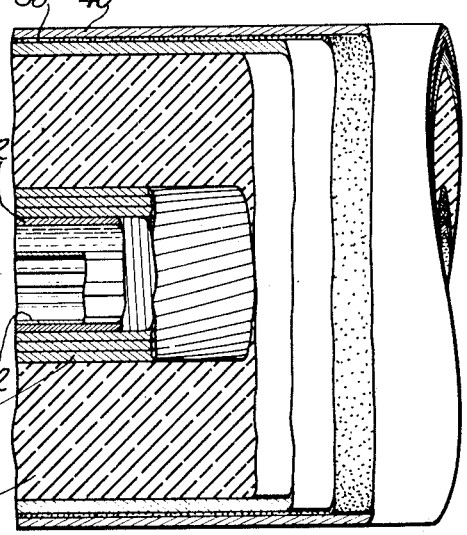
Inventor
EARL R. THOMAS.
By His Attorneys
Usina & Rauber April 17, 1934.  E. R. THOMAS  1,955,692
ELECTRIC CABLE
Filed March 25, 1929   3 Sheets-Sheet 2
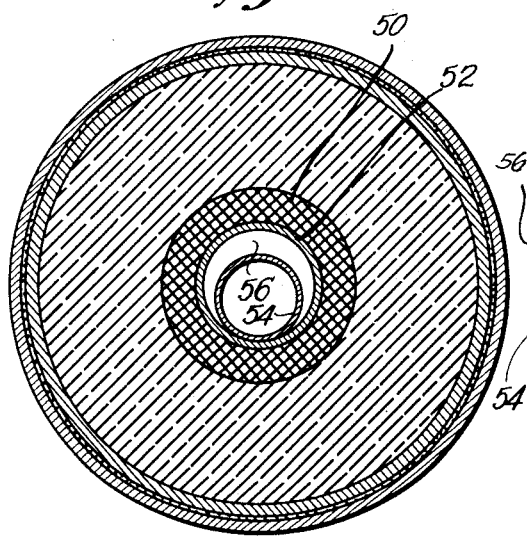
Fig. 3.
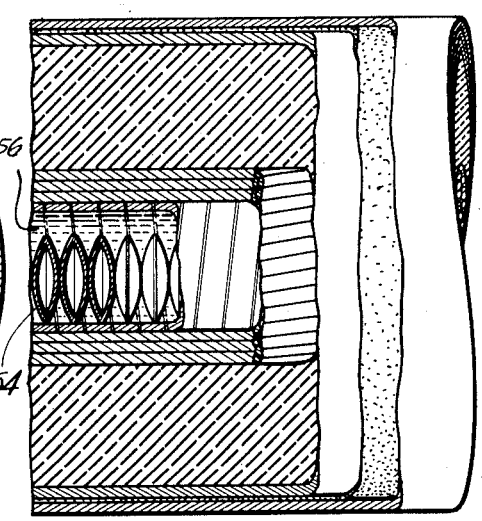
Fig. 3.ª
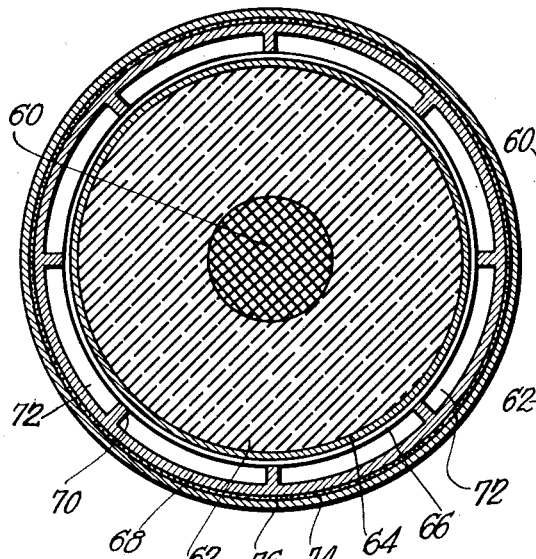
Fig. 4.
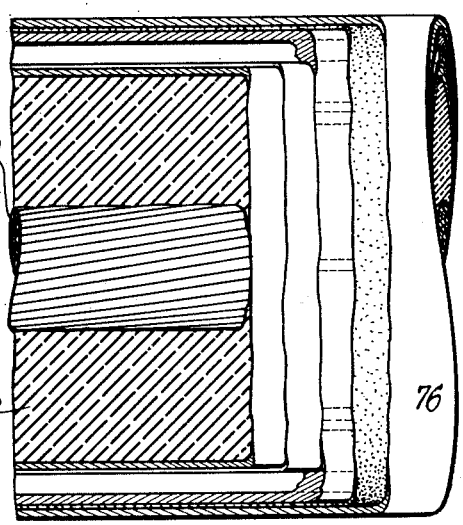
Fig. 4.ª
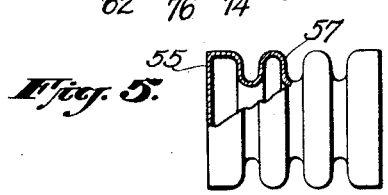
Fig. 5.
Inventor
EARL R. THOMAS.
By his Attorneys April 17, 1934.  E. R. THOMAS  1,955,692
ELECTRIC CABLE
Filed March 25, 1929  3 Sheets-Sheet 3
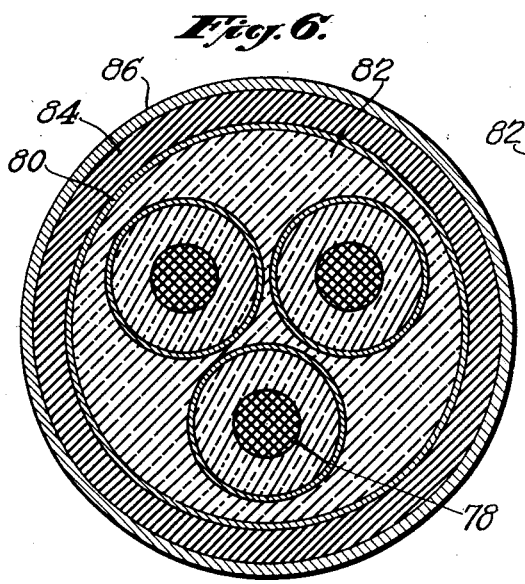
Fig. 6.
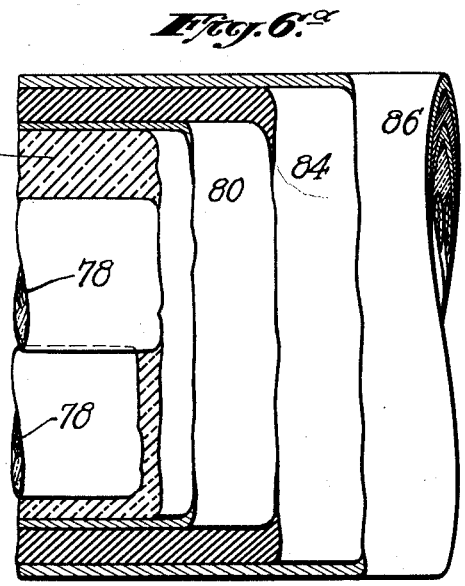
Fig. 6.ª
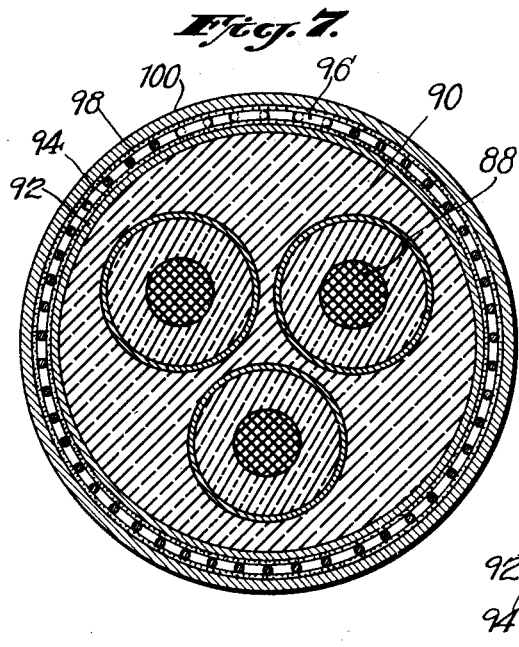
Fig. 7.
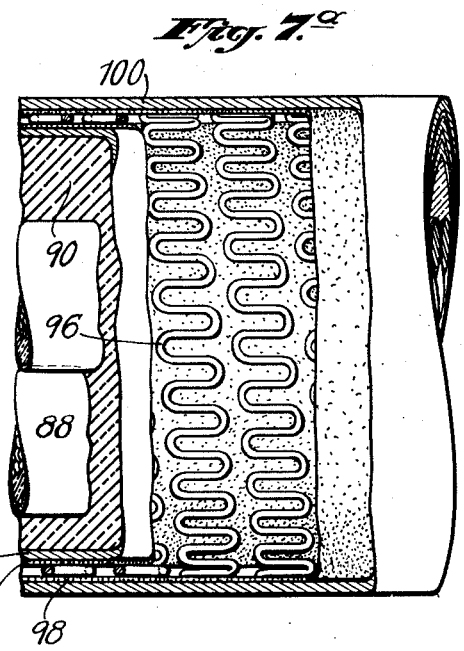
Fig. 7.ª
Inventor
EARL R. THOMAS.
By His Attorneys Patented Apr. 17, 1934

1,955,692

UNITED STATES PATENT OFFICE 1,955,692

ELECTRIC CABLE

Earl R. Thomas, Palisades Park, N. J.

Application March 25, 1929, Serial No. 349,644

1 Claim. (Cl. 173—266)

This invention relates to improvements in electric cables and aims to provide means for compensating for the expansion and contraction of insulating material in cables so as to prevent the formation of voids and areas of low internal pressure within the cable during periods of temperature variation.

In cables comprising a conductor or conductors enclosed in metallic sheaths and the like, it is common in practice to surround the conductor or conductors with a body of insulating material of a cellulose structure impregnated with insulating compounds such as the various distillates of mineral oil alone or together with organic compounds. These insulating compounds are frequently in the liquid state at temperatures met with in normal operation of the cables and are frequently referred to as oil. Operating experience with oil impregnated insulation type of cables has clearly indicated the importance of excluding moisture from the interior of the cable and of maintaining the liquid insulation under positive pressure. But due to temperature changes pressure variations may cause the formation of voids or spaces of low pressure within the cable.

My invention aims to provide members integral with the cable structure which will expand or contract so as to compensate for any expansion or contraction of the insulating material in the cable. The invention may be embodied in various types of cables and while I have illustrated in detail several embodiments of the invention, the illustrations are to be interpreted in an illustrative rather than a limiting sense, since the invention is broadly directed to the incorporation within an insulated cable of an expansible and contractible member so as to prevent the formation of voids or spaces of low pressure within the cable.

In order that the invention may be readily applied by anyone skilled in the art to various types of cables I have shown and described in the following specification a number of alternative embodiments of the invention.

In the drawings:

Fig. 1 illustrates in cross section a multi-conductor cable embodying my invention;

Fig. 1ª is a side elevation of the cable of Fig. 1 with parts broken away to more clearly reveal structural characteristics of the cable;

Fig. 2 is a cross sectional view of another type of cable embodying my invention;

Fig. 2ª is a side elevation of the cable of Fig. 2 with parts broken away;

Fig. 3 illustrates a further alternative embodiment of the invention;

Fig. 3ª is a longitudinal section of the cable shown in Fig. 3, parts being shown in elevation;

Fig. 4 is a cross sectional view showing a further modification of the invention;

Fig. 4ª is a side elevation of the cable of Fig. 4 with parts broken away to reveal the interior of the cable structure;

Fig. 5 is a detail view partly in section and partly in elevation of a modified form of gas container;

Fig. 6 is a cross sectional view illustrating a modification;

Figure 6ª is a side elevation of the cable of Figure 6 with parts broken away;

Figure 7 is a cross section of a cable illustrating a further modification;

Fig. 7ª is a side elevation of the cable shown in Fig. 7 parts being broken away in the interest of clearness.

Referring in detail to Figs. 1 and 1ª I have here illustrated a multi-conductor cable including three conductors 10 each surrounded by a body of insulation 12. This insulation is enclosed by a metal shield 14. A sheath 16 surrounds the three conductors. Outside of the sheath there is a layer of friction reducing material 18 and outside of this is a cable armor 20.

Incorporated in the cable within the sheath 16 I provide a plurality of hollow expansible and contractible members 22. The members 22 are preferably filled with gas. They may be made of relatively thin flexible metal or in some cases may be of rubber. The cable of Fig. 1 may be filled with a liquid insulation such as oil or the like. This liquid insulation may permeate the insulation of bodies 12 surrounding the cables. When overheating occurs or in other words when temperature changes are set up due to heating, the members 22 are adapted to either expand or contract so as to prevent the formation of voids or low pressure spaces within the cable.

In the embodiment illustrated in Fig. 2, 30 represents the conductor, which as shown is in the form of a multiplicity of strands wound on a spiral core 32. The conductor is surrounded by a body of insulation 34 which is enclosed by a sheath 36 outside of which there is a layer of non-friction material 38 and an armor 40.

The interior of the spiral core 32 is adapted to accommodate a hollow expansible and contractible gas filled member 42. A body of liquid insulating compound 44 is adapted to be retained in the core 32. In this form of cable the member 42 is adapted to either expand or contract so as to compensate for expansion or contraction of the cable insulating material.

In the embodiment of the invention illustrated in Fig. 3, 50 is a conductor similar to that shown at 30 of Fig. 2. This conductor is wound around a core 52 similar to that shown in Fig. 2. The other parts are quite similar to the construction of Fig. 2 with the exception that the expansible and contractible members incorporated in the cable are in the form of a multiplicity of lozenge shaped hollow members 54. These are adapted to be disposed in the body of liquid insulating compound 56 introduced in the core 52. Instead of using lozenge shaped members as shown in Fig. 3ª I may substitute relatively longer members as illustrated at 55 in Fig. 5. These members being formed of thin metal and being provided with a series of corrugated ribs 57 so as to permit them to readily elongate or shorten in accordance with pressure variations of the liquid insulating material within the core 52. These members 55 are of course filled with gas.

In the embodiment of the invention illustrated in Fig. 4 the conductor 60 is surrounded by a body of insulating material 62 which is enclosed in the thin walled flexible sheath 64 outside of which there is a layer of friction reducing material 66. Surrounding the sheath 64 is an outer sheath 68 having a plurality of inward extensions 70 forming division walls defining a plurality of segmental spaces 72 adapted to be filled with gas. Outside of the sheath 68 there is provided a layer of friction reducing material 74 which in turn is surrounded by a reinforcing armor 76. The same construction can of course be applied to a multi-conductor cable.

In Fig. 6 I have shown a further modification in which several conductors 78 are enclosed by a thin flexible inner sheath 80 having a filling of insulation 82. Surrounding the thin sheath 80 is a body 84 of compressible material such as rubber or the like which is adapted to expand and contract in response to variations of pressure within the sheath 82. Surrounding the body of rubber 84 is a suitable reinforcing armor 86.

In the modification of Figs. 7 and 7ª a plurality of conductors 88 are surrounded by insulating material 90 within a thin flexible sheath 92. Outside of this sheath there is a layer of friction reducing material 94. Surrounding this layer of friction reducing material I provide a zig-zag spring 96 which is wound helically around the sheath 92. Outside of the spring is another layer of friction reducing material 98 which is enclosed by an outer covering or sheath 100.

While I have described with great particularity the details of the various embodiments of the invention herein illustrated it is not to be construed that I am limited thereto since various modifications and substitutions of equivalents may be made by those skilled in the art without departing from the invention as defined in the following claim.

I claim:

An insulated electric cable comprising an outer impermeable, fluid tight, inelastic sheath, a conductor, a body of insulating material impregnated with a liquid dielectric, an expansible and contractible means surrounding said body of insulating material and adapted to compensate for pressure variations caused by temperature changes and an intermediate impermeable liquid-tight sheath interposed between the body of insulating material and said expansible and contractible means.

EARL R. THOMAS.